(12) United States Patent
Kim

(10) Patent No.: US 12,344,513 B2
(45) Date of Patent: Jul. 1, 2025

(54) METHOD AND APPARATUS FOR DETECTING POSITION OF PALLET FOR TRUCK UNLOADING

(71) Applicant: HYUNDAI MOBIS CO., LTD., Seoul (KR)

(72) Inventor: Young Min Kim, Osan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 347 days.

(21) Appl. No.: 17/715,427

(22) Filed: Apr. 7, 2022

(65) Prior Publication Data
US 2022/0396459 A1    Dec. 15, 2022

(30) Foreign Application Priority Data
Jun. 14, 2021    (KR) .................. 10-2021-0076563

(51) Int. Cl.
| | |
|---|---|
| *B66F 9/06* | (2006.01) |
| *B66F 9/07* | (2006.01) |
| *B66F 9/075* | (2006.01) |
| *G05D 1/00* | (2006.01) |
| *G05D 1/02* | (2020.01) |
| *G06K 7/10* | (2006.01) |
| *G06K 7/14* | (2006.01) |

(52) U.S. Cl.
CPC .......... *B66F 9/063* (2013.01); *B66F 9/0755* (2013.01); *G05D 1/0231* (2013.01); *G06K 7/10366* (2013.01); *G06K 7/1417* (2013.01)

(58) Field of Classification Search
CPC ..... B66F 9/063; B66F 9/0755; G05D 1/0231; G06K 7/1417; G06K 7/10366
See application file for complete search history.

(56) References Cited

U.S. PATENT DOCUMENTS

| | | | |
|---|---|---|---|
| 10,708,965 B1* | 7/2020 | Subramanian | G01S 5/0027 |
| 11,922,253 B2* | 3/2024 | Jackson | G06K 19/0723 |
| 2016/0260160 A1* | 9/2016 | Cheng | H04L 69/22 |
| 2016/0358054 A1* | 12/2016 | Armitage | G06K 7/1417 |
| 2018/0120465 A1* | 5/2018 | Rose | G01V 3/02 |
| 2018/0349657 A1* | 12/2018 | Pantaloni | G06K 7/10178 |
| 2020/0024114 A1* | 1/2020 | Uchimura | G05D 1/024 |
| 2020/0031642 A1* | 1/2020 | Uchimura | B62D 15/029 |
| 2020/0031645 A1* | 1/2020 | Uchimura | B66F 9/082 |
| 2020/0377351 A1* | 12/2020 | Uchimura | B66F 9/0755 |
| 2021/0309501 A1* | 10/2021 | Takao | G05D 1/0234 |
| 2023/0137089 A1* | 5/2023 | Tretyakov | G07C 5/008 |
| | | | 701/25 |
| 2023/0185314 A1* | 6/2023 | Wollnack | G05D 1/0295 |
| | | | 701/2 |
| 2023/0273618 A1* | 8/2023 | Thode | G06V 20/56 |
| | | | 701/25 |
| 2023/0410360 A1* | 12/2023 | Dubbelman | G06T 7/75 |

(Continued)

*Primary Examiner* — Saul Rodriguez
*Assistant Examiner* — Ashley K Romano
(74) *Attorney, Agent, or Firm* — NSIP Law

(57) ABSTRACT

A pallet position detection apparatus is provided. The detection apparatus and method checks information on a pallet disposed on a vehicle by recognizing an Radio Frequency Identification (RFID) tag or a Quick Response (QR) code attached to the truck, and recognizes an exact position of the pallet by detecting a reflector positioned on the pallet by a Lidar sensor, and unloads the pallet from the truck using an unmanned forklift vehicle based on the recognized position of the pallet.

9 Claims, 3 Drawing Sheets

(56) References Cited

U.S. PATENT DOCUMENTS

2024/0067510 A1\* 2/2024 Ulbrich ................ G05D 1/0253
2024/0070412 A1\* 2/2024 Koprowski ........ G06K 19/0723
2024/0086841 A1\* 3/2024 Schoening ....... G06K 19/07773

\* cited by examiner

METHOD AND APPARATUS FOR DETECTING POSITION OF PALLET FOR TRUCK UNLOADING

CROSS-REFERENCE TO RELATED APPLICATIONS

This application claims the benefit under 35 USC § 119(a) of Korean Patent Application Number 10-2021-0076563, filed Jun. 14, 2021, the entire disclosure of which is incorporated by reference herein for all purposes.

BACKGROUND

1. Field

The present disclosure relates to a method and apparatus for detecting the position of a pallet for truck unloading. More particularly, the present disclosure relates to a detection apparatus and method that checks information on a pallet on a truck by recognizing an RFID tag or a QR code attached to the truck, and recognizes an exact position of the pallet by detecting a reflector positioned on the front of the pallet by a Lidar sensor, in order to unload the pallet from the truck using an unmanned forklift vehicle.

2. Description of Related Art

The description in this section merely provides background information related to the present disclosure and does not necessarily constitute the prior art.

Logistics automation in a smart factory may automate the transportation of parts or finished goods between trucks, warehouses, and production facilities. When loading or unloading cargo onto or from a truck during a logistics process, a pallet loaded with cargo may be moved by a forklift vehicle. Accordingly, when it comes to loading or unloading cargo onto or from a truck, logistics automation may facilitate the movement of a pallet by an unmanned forklift vehicle (also collectively called Automated Guided Vehicles (AGVs) together with other unmanned transport devices).

Although many advances have been made in technologies using an unmanned forklift vehicle to load cargo onto a trailer, there are few known applications where unmanned forklift vehicles may be implemented to unload cargo from a truck. When loading finished goods usually manufactured in production facilities onto a trailer, pallets loaded with finished goods can be controlled since the pallet type for these finished goods, the pallet's position for movement, etc. are already known. On the contrary, when unloading parts from a truck, controlling many different types of pallets loaded with the parts can be relatively difficult, because this requires identifying information on a variety of parts brought in from the outside, information on the pallets, and the exact positions of the pallets loaded on the truck.

A camera vision-based method may be used in order to identify a pallet's information or position. However, a problem with this method is that some of various pallet types may not be recognized, and any deformation of a portion of a pallet used for recognition may lead to a lower recognition rate. This creates a need for a detection method that allows information on a variety of pallets and their positions to be identified reliably and accurately.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a pallet position detection apparatus includes an information detector configured to receive information on a pallet disposed on a vehicle by reading a pallet information marker attached to the vehicle; a position detector configured to receive information on a position of the pallet by reading a pallet position marker attached to a preset position on the pallet; and a controller configured to control an unmanned forklift vehicle based on at least one of a size of the pallet and the position of the pallet based on the received information on the pallet and the received information on the position of the pallet.

The pallet information marker may be at least one of a Radio Frequency Identification (RFID) tag and a Quick Response (QR) code, and the information detector may include at least one of an RFID reader configured to read the RFID tag, and a QR code reader configured to read the QR code.

The pallet position marker may include a reflector configured to reflect a laser, and the position detector may include a Lidar sensor configured to sense the laser.

The information on the pallet may include data regarding at least one of the size of the pallet, a weight of the pallet, a position of a lifting hole of the pallet, a height at which the pallet is placed, and a preset position of the pallet position marker.

The controller may be configured to adjust a distance between two forks included in the unmanned forklift vehicle to correspond to the size of the pallet based on the information on the pallet.

The controller may be configured to: locate a center of the pallet based on the information on the position of the pallet, and control an operation of the unmanned forklift vehicle to move the unmanned forklift vehicle to the center of the pallet.

The controller may be configured to control a movement of the unmanned forklift vehicle to a side position of the vehicle to access the pallet.

In a general aspect, a method performed by a pallet position detection apparatus includes receiving information on a pallet disposed on a vehicle by reading a pallet information marker attached to the vehicle; adjusting a distance between two forks comprised in the unmanned forklift vehicle to correspond to a size of the pallet based on the received information on the pallet; receiving information on a position of the pallet on the vehicle by reading a pallet position marker attached to a preset position on the pallet; and controlling a movement of the unmanned forklift vehicle to the pallet based on the received information on the position of the pallet.

In a general aspect, a non-transitory computer-readable storage medium storing instructions that, when executed by one or more processors, causes the one or more processors to: receive information on a pallet disposed on a vehicle by reading a pallet information marker attached to the vehicle; adjust a distance between two forks comprised in an unmanned forklift vehicle to correspond to a size of the pallet based on the received information on the pallet; receive information on a position of the pallet on the vehicle by reading a pallet position marker attached to a preset position on the pallet; and control a movement of the unmanned forklift vehicle to the pallet based on the received information on the position of the pallet.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
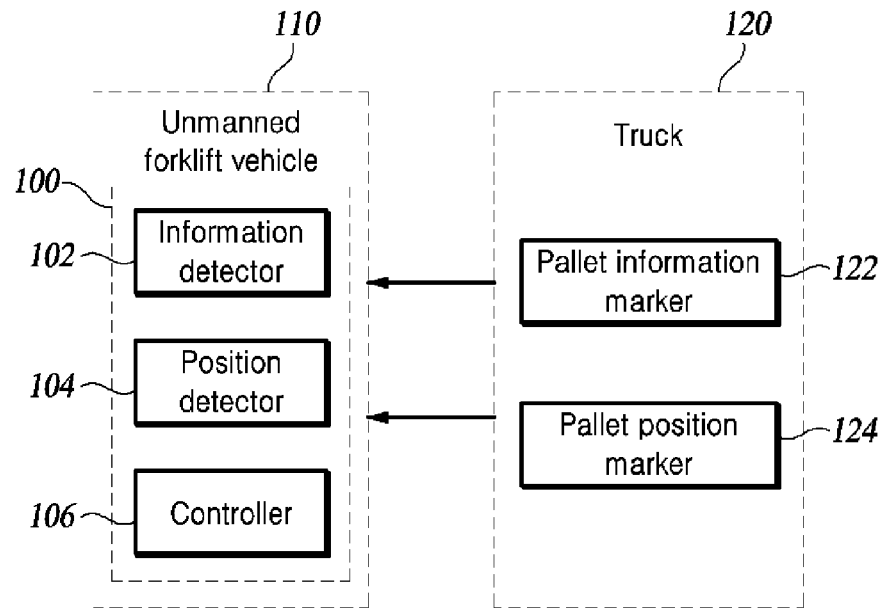
FIG. 1 is a block diagram conceptually showing a pallet position detection apparatus according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

An embodiment of this disclosure discloses an apparatus and method for detecting the position of a pallet for truck unloading. More specifically, an embodiment of this disclosure provides a detection apparatus and method that checks information on a pallet on a truck by recognizing an RFID tag or a QR code attached to the truck, and recognizes an exact position of the pallet by detecting a reflector positioned at the center of the pallet by a Lidar sensor, in order to unload the pallet from the truck using an unmanned forklift vehicle.

In the following description, a "truck" as used herein is a wing body truck (see FIG. 2) or a similar truck, for example. In the wing body truck, as two lids (or one lid) of a loading compartment open upward, loads (pallets and loads with the pallets) emerge. Unlike a trailer in which loading and unloading are performed at the rear of a truck, loading and unloading from the wing body truck are performed at the side of the truck. Meanwhile, it should be noted that, unless specified otherwise, the truck type is not necessarily limited to a wing body truck.

One or more examples, may provide a detection apparatus and method that determines information on a pallet on a truck by recognizing an Radio Frequency Identification (RFID) tag or a Quick Response (QR) code attached to the truck, and recognizes an exact position of the pallet by detecting a reflector positioned on the front, or other areas, of the pallet by a Lidar sensor, in order to unload the pallet from the truck using an unmanned forklift vehicle, regardless of the type and color of the pallet and whether the pallet is deformed or not.

Hereinafter, unless mentioned otherwise, pallets placed on a truck are assumed to be loaded with cargo.

FIG. 1 is a block diagram conceptually showing a pallet position detection apparatus according to an embodiment of the present disclosure.

The pallet position detection apparatus 100 (hereinafter, "detection apparatus") according to this disclosure recognizes the positions of pallets placed on a truck. The detection apparatus 100 is included in an unmanned forklift vehicle 110, and includes all or part of an information detector 102, a position detector 104, and a controller 106. The truck 120 includes a pallet information marker 122 and a pallet position marker 124 (attached to a pallet), as auxiliary means for position detection.

FIG. 1 illustrates an example construction, in accordance with one or more embodiments, and various implementations are possible, including other components or other connections between components, depending on the shapes of the pallet information marker and the pallet position marker, the structures and shapes of the information detector and the position detector, and the method of implementing the controller.

Figure 2:
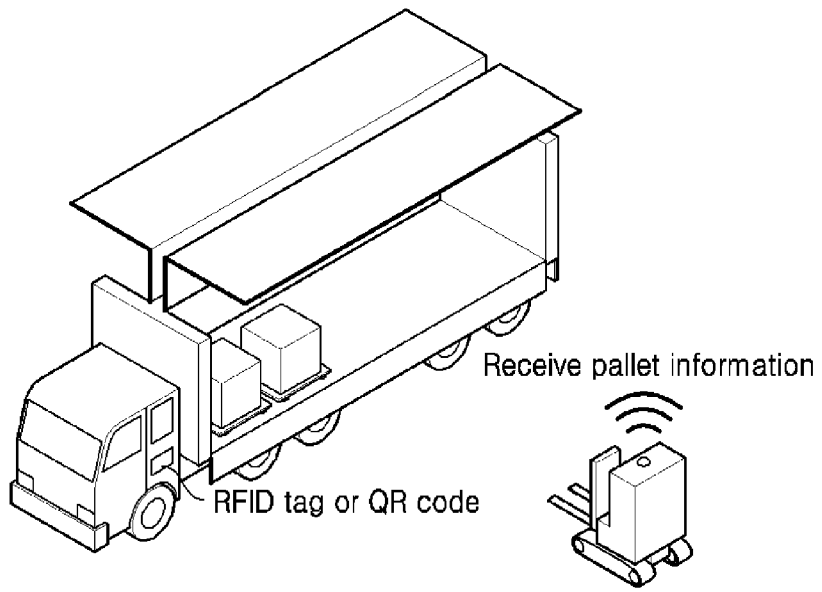
FIG. 2 illustrates an example view of an example unmanned forklift vehicle receiving pallet information from a truck according to an embodiment of the present disclosure.

FIG. 2 illustrates an example view of an unmanned forklift vehicle receiving pallet information from a truck, in accordance with one or more embodiments.

The information detector 102 obtains information on a pallet placed on the truck 120 by recognizing a pallet information marker attached to the truck 120. In one or more examples, an RFID tag or a QR code may be used as the pallet information marker. Accordingly, the information detector 102 includes an RFID reader, and may obtain information on a pallet by recognizing an RFID tag attached to the truck by using the RFID reader. Otherwise, the information detector 102 may include a QR code reader, and obtain information on a pallet by recognizing a QR code attached to the truck.

The information on the pallet may include data regarding the size and weight of the pallet placed on the truck 120, the position of a lifting hole (into which the forks are inserted), the height at which the pallet is placed, the position of the pallet position marker, and so on.

Figure 3:
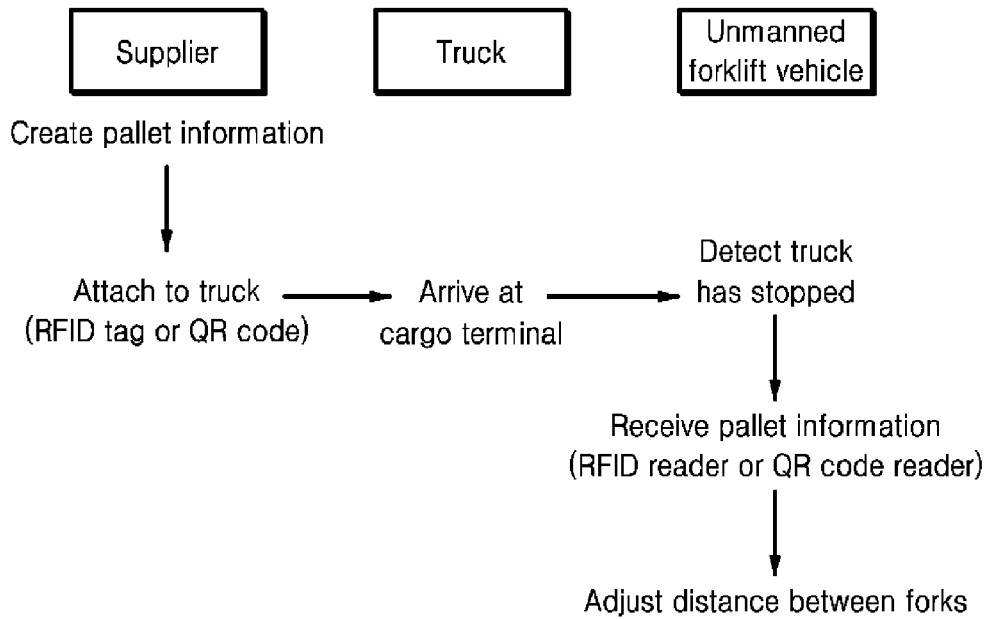
FIG. 3 illustrates a schematic flowchart related to creating and recognizing a pallet information marker, in accordance with one or more embodiments

Meanwhile, as illustrated in FIG. 3, the RFID tag or the QR code may be created by a supplier and attached to the truck 120. As illustrated in FIG. 2, the RFID tag or the QR code may be located midway between a driver's seat and a cargo area and attached at a preset proper height, in consideration of the installation height of a sensor included in the information detector 102.

The RFID tag or the QR code has a recognizable distance according to their standard. Thus, as illustrated in FIG. 3, after a truck arrives at a cargo terminal and stops, the unmanned forklift vehicle 110 may access the truck 120 within the recognizable distance, in order to recognize the RFID tag or the QR code.

The position of a pallet on the truck may vary based on a number of factors, such as pallet size, loading by a supplier, and vibration during transportation by the truck.

The position detector 104 according to this embodiment may include a sensor for position detection, and, based on this sensor, may obtain information on the position of the pallet by recognizing a pallet position marker attached to the front of the pallet.

Figure 4:
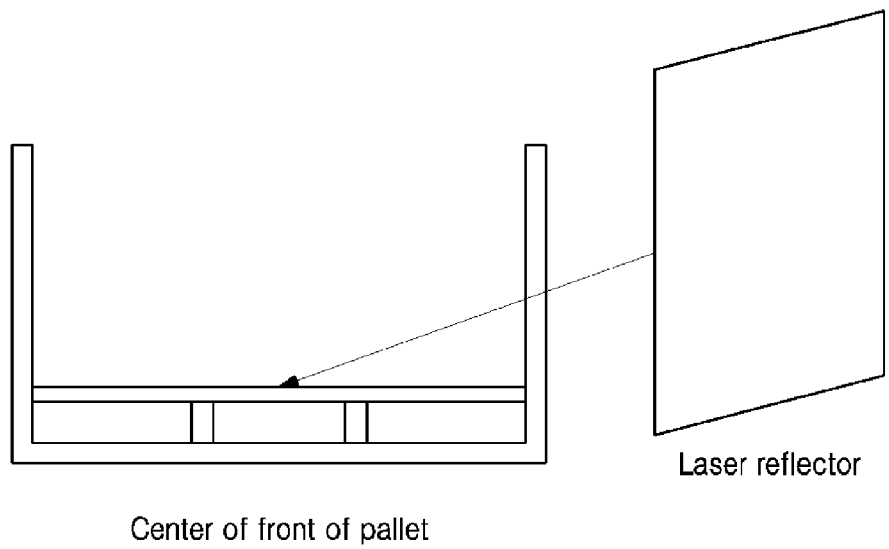
FIG. 4 illustrates an example view of a position where a pallet position marker is attached, in accordance with one or more embodiments.

The pallet position marker may be attached to, but is not limited to, the center of the front of the pallet, as illustrated in FIG. 4, and may be attached to anywhere on the front of the pallet as long as it is set. Information on the position where the position marker is attached may be transmitted to the unmanned forklift vehicle 110 while contained in the aforementioned information on the pallet.

To recognize the pallet position marker, the position detector 104 may include a Lidar sensor, for example. In this case, the pallet position marker may be a reflector that can reflect a laser.

Using the information on the pallet, the controller 105 may adjust the distance between two forks included in the unmanned forklift vehicle 100 so as to fit the position of a lifting hole in the pallet.

Figure 5:
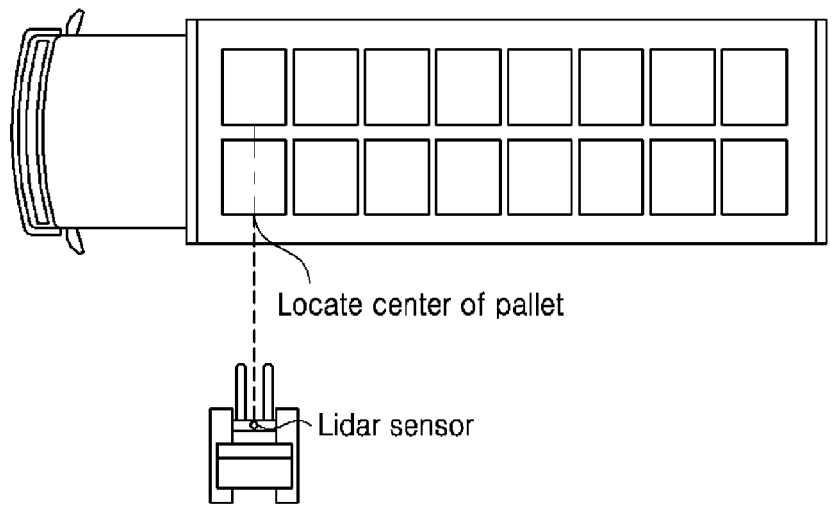
FIG. 5 illustrates an example view showing the concept of access control when an unmanned forklift vehicle accesses a pallet, in accordance with one or more embodiments.

The controller 106 locates the center of the pallet by using the information on the pallet's position obtained based on the pallet position marker. As illustrated in FIG. 5, the controller 106 may control the unmanned forklift vehicle 110's access, in such a way that the unmanned forklift vehicle 110 approaches in a direction at right angles to the front of the pallet and the unmanned forklift vehicle 110 travels toward the center of the pallet. In the example illustrated in FIG. 5, the number of pallets placed on the truck is sixteen.

After accessing the pallet, the unmanned forklift vehicle 110 may adjust the height of the forks, the distance between which has been adjusted, to fit the height of the truck's cargo area where the pallet is positioned, and then start unloading of the pallet by inserting them into the lifting hole.

A device (not shown) to be equipped with the detection apparatus 100 according to this embodiment may be a programmable computer installed in the unmanned forklift vehicle 110, and includes at least one radio communication interface that can connect to a server (not shown). Using this radio communication interface, the server may control the overall operation of the unmanned forklift vehicle 110 unloading cargo from the truck 120.

According to another embodiment of the present disclosure, the truck 120 may include a programmable computer and at least one radio communication interface that can connect to a server. In this case, the supplier may have the information on the pallet stored in a storage device attached to the programmable computer installed in the truck 120. The truck 120 may transmit the information on the pallet stored in the storage device to the server using the radio communication interface, and the server may forward the information on the pallet to the unmanned forklift vehicle 110.

According to another embodiment of the present disclosure, the information on the pallet stored in the storage device may be transmitted directly to the unmanned forklift vehicle 110 from the truck 120, by using the radio communication interfaces respectively installed in the unmanned forklift vehicle 110 and the truck 120.

As described above, according to this embodiment, it is possible to unload a pallet from a truck using an unmanned forklift vehicle, regardless of the type and color of the pallet and whether the pallet is deformed or not, by providing a detection apparatus and method that recognizes an accurate position of the pallet. Moreover, according to this embodiment, the detection apparatus may be used on a newly added pallet simply by adding information on the new pallet to a database.

In addition, according to this embodiment, in a case where the unmanned forklift vehicle is already equipped with an RFID reader, a QR code reader, or a Lidar sensor for other purpose (for example, monitoring a rack's position, estimating the position of the unmanned forklift vehicle, detecting an obstacle, etc.), a pallet position detection apparatus may be implemented simply by a software upgrade without an additional sensor.

Figure 6:
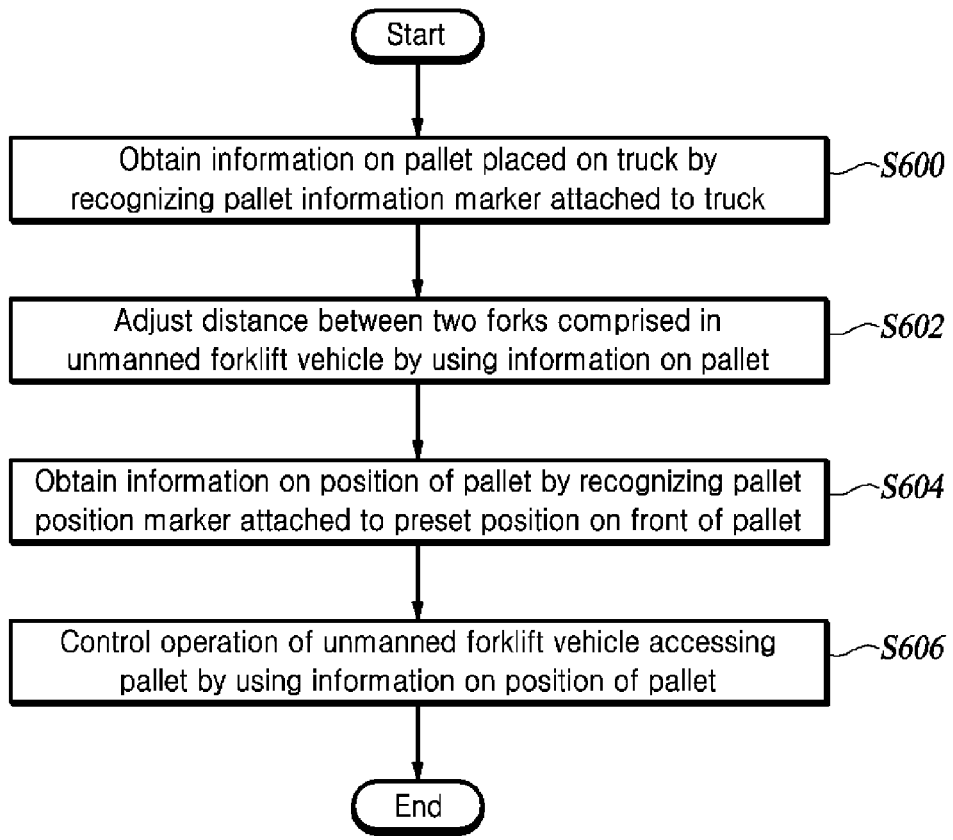
FIG. 6 is a flowchart of a method for detecting the position of a pallet, in accordance with one or more embodiments.

FIG. 6 is a flowchart of a method for detecting the position of a pallet, in accordance with one or more embodiments.

After an unmanned forklift vehicle 110 accesses a truck, the detection apparatus 100 obtains information on a pallet placed on the truck by recognizing a pallet information marker attached to the truck (operation S600). As the pallet information marker, an RFID tag or a QR code may be used. Thus, the detection apparatus 100 obtains information on a pallet by recognizing an RFID tag attached to the truck by using an RFID reader. Otherwise, the detection apparatus 100 may obtain information on a pallet by recognizing a QR code attached to the truck by using a QR code reader.

The information on the pallet may contain data regarding the size and weight of the pallet placed on the truck 120, the position of a lifting hole, the height at which the pallet is placed, the position of the pallet position marker, and so on.

Since the RFID tag or the QR code has a recognizable distance according to their standard, the unmanned forklift vehicle 110 may access the truck 120 within the recognizable distance, in order to recognize the RFID tag or the QR code.

Using the information on the pallet, the detection apparatus 100 adjusts the distance between the two forks included in the unmanned forklift vehicle so as to fit the size of the pallet (operation S602).

The detection apparatus 100 obtains information on the position of the pallet by recognizing a pallet position marker attached to a preset position on the front of the pallet, based on a sensor for position detection (operation S604). Information on the position where the position marker is attached may be transmitted to the unmanned forklift vehicle 110 while contained in the aforementioned information on the pallet.

To recognize the pallet position marker, the detection apparatus 100 may include a Lidar sensor, for example. In this case, the pallet position marker may be a reflector that can reflect a laser.

Using the information on the position of pallet, the detection apparatus 100 adjusts the unmanned forklift vehicle's access to the pallet (operation S606).

The detection apparatus 100 may locate the center of the pallet by using the information on the pallet's position obtained based on the pallet position marker, and then control the unmanned forklift vehicle 110's access to the pallet.

Although some examples present flowcharts with the steps thereof illustrated as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of steps described by the respective flowcharts or by performing one or more of the steps in the flowcharts in parallel, and hence the steps in the respective flowcharts are not limited to the illustrated chronological sequences.

The information detector 102, position detector 104, controller 106, pallet information marker 122 and pallet position marker 124, as well as the remaining apparatuses, units, modules, devices, and other components, described herein may be implemented by hardware components and software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

REFERENCE NUMERALS

100: Pallet position detection apparatus
102: Information detector
104: Position detector
106: Controller
110: Unmanned forklift vehicle
120: Truck

What is claimed is:

1. A pallet position detection apparatus, the apparatus comprising:
an information detector configured to receive information on a pallet disposed on a vehicle by reading a pallet information marker attached to the vehicle;
a position detector configured to receive information on a position of the pallet by reading a pallet position marker attached to a preset position on the pallet, wherein the pallet position marker includes a reflector positioned at the center of the pallet and is configured to reflect a laser, and the position detector includes a Lidar sensor configured to sense the laser; and
a controller configured to control an unmanned forklift vehicle based on at least one of a size of the pallet and the position of the pallet based on the received information on the pallet and the received information on the position of the pallet.

2. The apparatus of claim 1, wherein the pallet information marker is at least one of a Radio Frequency Identification (RFID) tag and a Quick Response (QR) code, and
wherein the information detector comprises at least one of an RFID reader configured to read the RFID tag, and a QR code reader configured to read the QR code.

3. The apparatus of claim 2, wherein the RFID tag and/or the QR code is disposed midway between a driver's seat and a cargo area and attached at a preset height.

4. The apparatus of claim 1, wherein the information on the pallet comprises data regarding at least one of the size of the pallet, a weight of the pallet, a position of a lifting hole of the pallet, a height at which the pallet is placed, and a preset position of the pallet position marker.

5. The apparatus of claim 1, wherein the controller is configured to adjust a distance between two forks comprised in the unmanned forklift vehicle to correspond to the size of the pallet based on the information on the pallet.

6. The apparatus of claim 1, wherein the controller is configured to:
locate a center of the pallet based on the information on the position of the pallet, and
control an operation of the unmanned forklift vehicle to move the unmanned forklift vehicle to the center of the pallet.

7. The apparatus of claim 1, wherein the controller is configured to control a movement of the unmanned forklift vehicle to a side position of the vehicle to access the pallet.

8. A method performed by a pallet position detection apparatus, the method comprising:
receiving information on a pallet disposed on a vehicle by reading a pallet information marker attached to the vehicle;
adjusting a distance between two forks comprised in the unmanned forklift vehicle to correspond to a size of the pallet based on the received information on the pallet;
receiving, by a position detector, information on a position of the pallet on the vehicle by reading a pallet position marker attached to a preset position on the pallet, wherein the pallet position marker includes a reflector positioned at the center of the pallet and is configured to reflect a laser, and the position detector includes a Lidar sensor configured to sense the laser; and
controlling a movement of the unmanned forklift vehicle to the pallet based on the received information on the position of the pallet.

9. A non-transitory computer-readable storage medium storing instructions that, when executed by one or more processors, causes the one or more processors to:

receive information on a pallet disposed on a vehicle by reading a pallet information marker attached to the vehicle;

adjust a distance between two forks comprised in an unmanned forklift vehicle to correspond to a size of the pallet based on the received information on the pallet;

receive, by a position detector, information on a position of the pallet on the vehicle by reading a pallet position marker attached to a preset position on the pallet, wherein the pallet position marker includes a reflector positioned at the center of the pallet and is configured to reflect a laser, and the position detector includes a Lidar sensor configured to sense the laser; and control a movement of the unmanned forklift vehicle to the pallet based on the received information on the position of the pallet.

* * * * *